United States Patent
Tabuchi et al.

(10) Patent No.: US 10,262,431 B2
(45) Date of Patent: Apr. 16, 2019

(54) THREE-DIMENSIONAL MEASUREMENT DEVICE

(71) Applicant: Keyence Corporation, Osaka (JP)

(72) Inventors: Jun Tabuchi, Osaka (JP); Masaki Fujiwara, Osaka (JP)

(73) Assignee: Keyence Corporation, Osaka (JP)

( * ) Notice: Subject to any disclaimer, the term of this patent is extended or adjusted under 35 U.S.C. 154(b) by 15 days.

(21) Appl. No.: 15/619,556

(22) Filed: Jun. 12, 2017

(65) Prior Publication Data

US 2017/0372489 A1    Dec. 28, 2017

(30) Foreign Application Priority Data

Jun. 24, 2016 (JP) ................... 2016-126090

(51) Int. Cl.
*G06K 9/00* (2006.01)
*G06T 7/62* (2017.01)
*G06T 7/00* (2017.01)

(52) U.S. Cl.
CPC ............... *G06T 7/62* (2017.01); *G06T 7/001* (2013.01); *G06T 2207/10028* (2013.01); *G06T 2207/20092* (2013.01); *G06T 2207/20101* (2013.01); *G06T 2207/20104* (2013.01); *G06T 2207/30164* (2013.01)

(58) Field of Classification Search
CPC combination set(s) only.
See application file for complete search history.

(56) References Cited

U.S. PATENT DOCUMENTS

| | | | |
|---|---|---|---|
| 2004/0041805 A1* | 3/2004 | Hayano | G06T 15/00 345/419 |
| 2012/0194672 A1 | 8/2012 | Kawa | |
| 2012/0194673 A1 | 8/2012 | Kawa | |
| 2014/0029808 A1* | 1/2014 | Lee | G06K 9/00362 382/110 |
| 2014/0071243 A1 | 3/2014 | Nakatsukasa | |
| 2014/0071458 A1 | 3/2014 | Nakatsukasa | |
| 2014/0071459 A1 | 3/2014 | Nakatsukasa | |
| 2014/0146325 A1 | 5/2014 | Tabuchi | |
| 2014/0152794 A1 | 6/2014 | Takahashi | |
| 2017/0030706 A1 | 2/2017 | Natori et al. | |
| 2017/0032177 A1 | 2/2017 | Suenaga et al. | |

* cited by examiner

*Primary Examiner* — Alex Kok S Liew
(74) *Attorney, Agent, or Firm* — Kilyk & Bowersox, P.L.L.C.

(57) ABSTRACT

A three-dimensional measurement device which is capable of superimposing and displaying, on a three-dimensional shape, distributions of deviations from a plurality of geometric elements is provided. There are included a deviation calculation unit for determining first deviations from the first geometric element with respect to the first point cloud, and determining second deviations from the second geometric element with respect to the second point cloud. The three-dimensional shape display unit superimposes and displays, on the three-dimensional shape, a distribution of the first deviations from the first geometric element and a distribution of the second deviations from the second geometric element.

14 Claims, 14 Drawing Sheets

PRIOR ART ated by three-dimensional arranging the large number of measurement points, for example. In dimension measurement, the distance or the angle between geometric elements is determined by extracting a plurality of geometric elements. A geometric element at a measurement position may be extracted by designating the type of a basic shape, and selecting a point cloud consisting of a plurality of measurement points.

THREE-DIMENSIONAL MEASUREMENT DEVICE

CROSS-REFERENCE TO RELATED APPLICATIONS

The present application claims foreign priority based on Japanese Patent Application No. 2016-126090, filed Jun. 24, 2016, the contents of which is incorporated herein by reference.

BACKGROUND OF THE INVENTION

1. Field of the Invention

The present invention relates to a three-dimensional measurement device, and more particularly, to an improvement in a three-dimensional measurement device for extracting a geometric element from a point cloud representing a three-dimensional shape of a measurement target object and displaying a distribution of deviations.

2. Description of Related Art

A three-dimensional measurement device is a measurement instrument for three-dimensionally measuring the shape or the dimensions of a measurement target object, and is capable of acquiring three-dimensional shape data containing position information of a large number of measurement points in a three-dimensional space. The acquired three-dimensional shape data is displayed as a three-dimensional shape obtained by three-dimensionally arranging the large number of measurement points, for example. In dimension measurement, the distance or the angle between geometric elements is determined by extracting a plurality of geometric elements. A geometric element at a measurement position may be extracted by designating the type of a basic shape, and selecting a point cloud consisting of a plurality of measurement points.

Furthermore, by determining a deviation from a geometric element for each measurement point included in a point cloud, and superimposing and displaying, on a three-dimensional shape, a distribution of deviations from the geometric element, undulation of a surface of a measurement target object or dispersion of measurement points may be visualized.

With a conventional three-dimensional measurement device as described above, only the deviation distribution regarding a single geometric element, among geometric elements extracted from a point cloud, can be displayed. Accordingly, it is difficult to compare the degree of undulation for a plurality of geometric elements of a three-dimensional shape. Also, only the deviation distribution from a plane can be displayed.

FIGS. 15A to 15C are diagrams showing an operation of a conventional three-dimensional measurement device. FIG. 15A shows a three-dimensional shape of a measurement target object W displayed on a screen. The measurement target object W has stair-like steps, and it is conceivable to examine the degree of undulation for two surfaces of an upper surface $S_1$ of the lower step and an upper surface $S_2$ of an upper step. In this case, first, a point cloud is selected on the three-dimensional shape being displayed, and a geometric element is extracted.

FIG. 15B shows a deviation distribution which was determined with the upper surface $S_1$ of the lower step as a reference surface. One geometric element corresponding to the upper surface $S_1$ is designated as a reference surface, and deviations of measurement points from the reference surface are determined. A deviation distribution determined in this manner may be superimposed and displayed on the three-dimensional shape. For example, different colors are assigned to respective measurement points according to the deviations. FIG. 15C shows a deviation distribution which was determined with the upper surface $S_2$ of the upper step as a reference surface. When a geometric element corresponding to the upper surface $S_2$ is designated as a reference surface, a deviation distribution for the reference surface is superimposed and displayed on the three-dimensional shape.

As described above, according to a conventional three-dimensional measurement device, only one geometric element can be designated as the reference surface for determining the deviation. Also, as shown in FIG. 15B, at a part $D_1$ above the upper surface $S_1$, a deviation upper limit for color assignment is exceeded, and the part is assigned with a single display color (red), and at a part $D_2$ below the upper surface $S_1$, a deviation lower limit for color assignment is not reached, and the part is assigned with a single display color (blue). According to such display of deviation distribution, because parts other than the upper surface $S_1$ are solidly colored, the three-dimensional shape of the measurement target object W cannot be recognized.

SUMMARY OF THE INVENTION

The present invention has been made in view of the above circumstances, and has its object to provide a three-dimensional measurement device which is capable of superimposing and displaying, on a three-dimensional shape, a distribution of deviations from a plurality of geometric elements. In particular, a three-dimensional measurement device which allows comparison between the degrees of undulation for a plurality of geometric elements of a three-dimensional shape is aimed to be provided. Also, a three-dimensional measurement device which is capable of superimposing and displaying, on a three-dimensional shape, a distribution of deviations from a cylinder, a cone, or a sphere is aimed to be provided.

According to one embodiment of the invention, a three-dimensional measurement device includes a shape measurement unit for measuring position information of a plurality of measurement points in a three-dimensional space, and generating a point cloud representing a three-dimensional shape of a measurement target object, a three-dimensional shape display unit for displaying the three-dimensional shape of the measurement target object based on the point cloud, a point cloud selection unit for receiving designation of a position on the three-dimensional shape displayed by the three-dimensional shape display unit, and selecting, based on the designation of the position, a point cloud for extracting a geometric element, a geometric element extraction unit for specifying a first geometric element that fits a first point cloud selected by the point cloud selection unit, and specifying a second geometric element that fits a second point cloud selected by the point cloud selection unit, and a deviation calculation unit for determining first deviations from the first geometric element with respect to the first point cloud, and determining second deviations from the second geometric element with respect to the second point cloud. The three-dimensional shape display unit superimposes and displays, on the three-dimensional shape, a distribution of the first deviations from the first geometric element and a distribution of the second deviations from the second geometric element.

According to such a configuration, the distribution of the first deviations from the first geometric element and the distribution of the second deviations from the second geometric element are superimposed and displayed on the three-dimensional shape, and thus, the degree of undulation may be compared for a plurality of geometric elements on the three-dimensional shape.

According to another embodiment of the invention, in addition to the configuration described above, the three-dimensional measurement device further includes a deviation display target region designation unit for designating a deviation display target region including the first geometric element, where the three-dimensional shape display unit displays the distribution of the first deviations from the first geometric element with respect to the first point cloud in the deviation display target region.

According to such a configuration, the display target of the first deviations is limited to within the deviation display target region including the first geometric element, and thus, parts of the three-dimensional shape other than the geometric element for which the first deviations are to be determined may be prevented from becoming unrecognizable due to display of the deviation distribution.

According to still another embodiment of the invention, in addition to the configuration described above, the three-dimensional measurement device further includes a deviation display target region designation unit for designating a deviation display target region including the second geometric element, where the three-dimensional shape display unit displays the distribution of the second deviations from the second geometric element with respect to the second point cloud in the deviation display target region.

According to such a configuration, the display target of the second deviations is limited to within the deviation display target region including the second geometric element, and thus, parts of the three-dimensional shape other than the geometric element for which the second deviations are to be determined may be prevented from becoming unrecognizable due to display of the deviation distribution.

According to still another embodiment of the invention, in addition to the configuration described above, the three-dimensional measurement device further includes a shape type designation unit for receiving designation of a type of a basic shape with respect to a geometric element that is an extraction target, where the basic shape is a cylinder, a cone, or a sphere, and where the deviation calculation unit determines deviations in a normal direction from a side surface of the cylinder, a side surface of the cone, or a surface of the sphere. According to such a configuration, a distribution of deviations from a geometric element may be displayed regardless of whether the geometric element extracted from a point cloud is a cylinder, a cone, or a sphere.

According to still another embodiment of the invention, in addition to the configuration described above, the three-dimensional measurement device is configured such that the three-dimensional shape display unit displays the distribution of the first deviations by assigning, to the first point cloud, different colors according to the first deviations. According to such a configuration, the distribution of the first deviations from the first geometric element may be displayed in color.

According to still another embodiment of the invention, in addition to the configuration described above, the three-dimensional measurement device is configured such that the three-dimensional shape display unit displays the distribution of the second deviations by assigning, to the second point cloud, different colors according to the second deviations. According to such a configuration, the distribution of the second deviations from the second geometric element may be displayed in color.

According to one embodiment of the invention, a three-dimensional measurement device includes a shape data generation unit for generating three-dimensional shape data containing position information of a large number of measurement points in a three-dimensional space, a three-dimensional shape display unit for displaying a three-dimensional shape of a measurement target object based on the three-dimensional shape data, a shape type designation unit for receiving designation of a type of a basic shape from shapes including a cylinder, a cone, and a sphere with respect to a geometric element that is an extraction target, a point cloud selection unit for selecting a point cloud that is a point cloud including the measurement points and that is for extracting the geometric element, a geometric element extraction unit for specifying the geometric element as the basic shape that is fitted with the point cloud, and a deviation calculation unit for determining deviations from the geometric element with respect to the measurement points included in the point cloud. The three-dimensional shape display unit superimposes and displays, on the three-dimensional shape, a distribution of the deviations from the geometric element. According to such a configuration, by designating a cylinder, a cone, or a sphere as the type of the basic shape, a distribution of deviations from the cylinder, the cone, or the sphere may be superimposed and displayed on a three-dimensional shape.

According to another embodiment of the invention, in addition to the configuration described above, the three-dimensional measurement device further includes a deviation display target region designation unit for designating a deviation display target region including the geometric element, where the three-dimensional shape display unit displays the distribution of the deviations from the geometric element with respect to the measurement points in the deviation display target region. According to such a configuration, since a deviation distribution display target is limited to within the deviation display target region including the geometric element, the three-dimensional shape of a part different from the geometric element for which the deviation is to be determined may be prevented from becoming unrecognizable due to display of a deviation distribution.

According to still another embodiment of the invention, in addition to the configuration described above, the three-dimensional measurement device is configured such that the basic shape is a cylinder, a cone, or a sphere, and the deviation calculation unit determines deviations in a normal direction from a side surface of the cylinder, a side surface of the cone, or a surface of the sphere. According to such a configuration, a distribution of deviations from a geometric element may be displayed regardless of whether the geometric element extracted from a point cloud is a cylinder, a cone, or a sphere.

According to still another embodiment of the invention, in addition to the configuration described above, the three-dimensional measurement device is configured such that the three-dimensional shape display unit displays the distribution of the deviations by assigning, to the measurement points, different colors according to the deviations. According to such a configuration, the distribution of the deviations from the geometric element may be displayed in color.

According to the present invention, distributions of deviations from a plurality of geometric elements may be superimposed and displayed on a three-dimensional shape. In particular, since the distribution of first deviations from a first geometric element and the distribution of second deviations from a second geometric element are superimposed and displayed on a three-dimensional shape, the degree of undulation may be compared for a plurality of geometric elements on the three-dimensional shape. Also, by designating a cylinder, a cone, or a sphere as the type of a basic shape, a distribution of deviations from the cylinder, the cone, or the sphere may be superimposed and displayed on the three-dimensional shape.

DETAILED DESCRIPTION OF PREFERRED EMBODIMENTS

Figure 1:
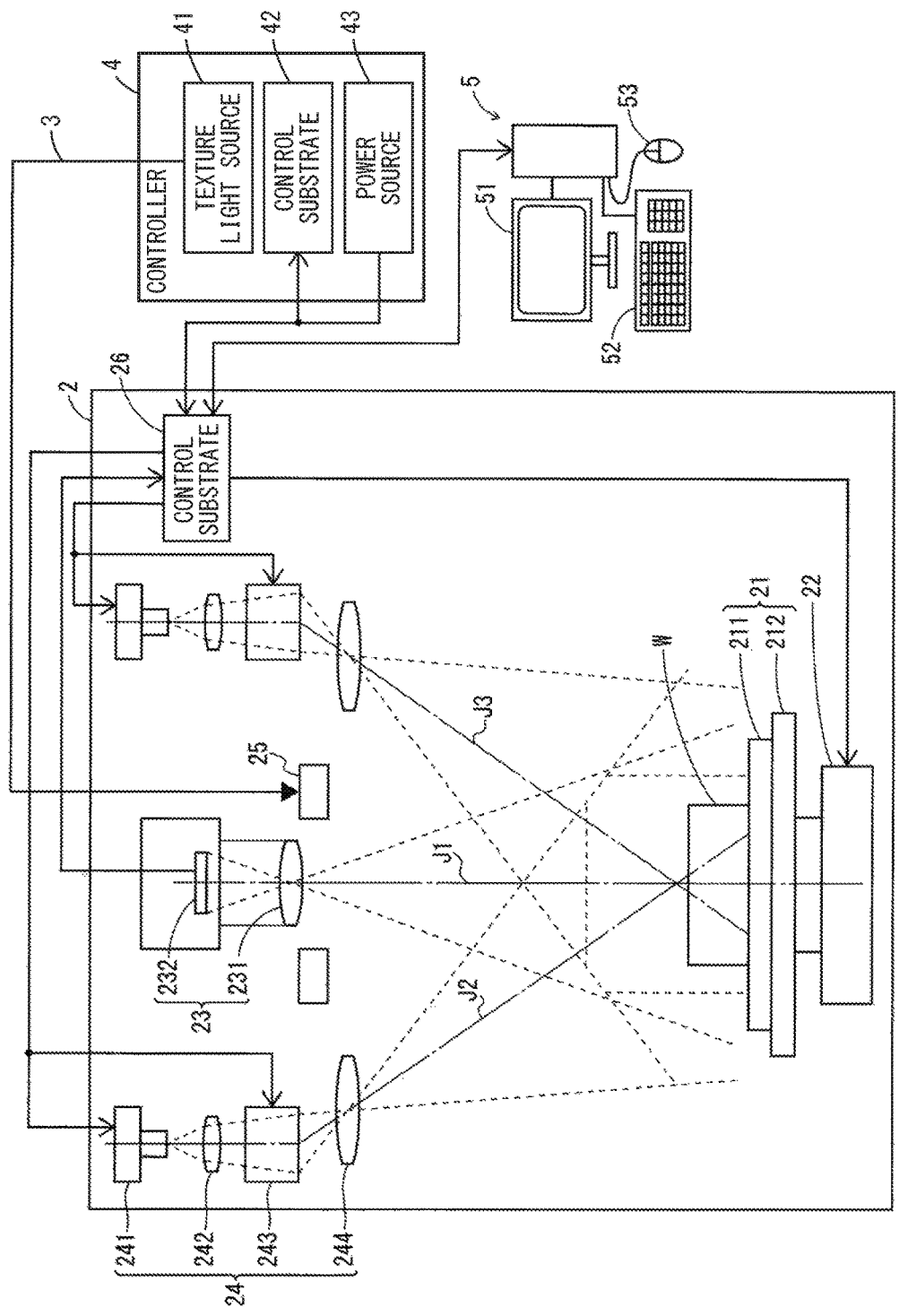
FIG. 1 is a system diagram showing an example configuration of a three-dimensional measurement device according to an embodiment of the present invention.

First, a schematic configuration of a three-dimensional measurement device according to the present invention will be described below with reference to FIGS. 1 to 6.
<Three-Dimensional Measurement Device 1>
FIG. 1 is a system diagram showing an example configuration of a three-dimensional measurement device 1 according to an embodiment of the present invention. The three-dimensional measurement device 1 is a measurement instrument for optically measuring the shape of a measurement target object W, and is configured from a measurement unit 2, a controller 4, and an information processing terminal 5.
<Measurement Unit 2>

The measurement unit 2 is a head unit for radiating detection light of visible light on a measurement target object W placed on a stage 21, receiving the detection light reflected by the measurement target object W, and generating a captured image, and is configured from the stage 21, a rotation drive unit 22, an imaging unit 23, light projection units 24, texture illumination emitting units 25, and a control substrate 26. The stage 21, the imaging unit 23, the light projection units 24, and the texture illumination emitting units 25 of the measurement unit 2 are accommodated in a unitary housing.

The stage 21 is a work table having a flat, horizontal mounting surface where the measurement target object W is to be mounted. The stage 21 is formed from a stage plate 211, which is a circular disc, and a stage base 212 supporting the stage plate 211.

The stage plate 211 can be bent at around the center and be fixed, and can function as a ramp for causing the measurement target object W to normally face the imaging unit 23. The rotation drive unit 22 rotates the stage 21 around a rotation axis along the vertical direction so as to adjust the imaging angle of the measurement target object W on the stage 21.

The imaging unit 23 is a camera with fixed magnification for capturing an image of the measurement target object W on the stage 21, and is configured from a light receiving lens 231 and an image sensor 232. The image sensor 232 receives detection light from the measurement target object W through the light receiving lens 231, and generates a captured image. As the image sensor 232, an image sensor such as a charge coupled device (CCD) or a complementary metal oxide semiconductor (CMOS) is used. For example, the image sensor 232 is a monochrome image sensor.

The light projection unit 24 is an illumination device for radiating detection light on the measurement target object W on the stage 21, and is configured from a projection light source 241, a collector lens 242, a pattern generation unit 243, and a light projection lens 244. As the projection light source 241, a light-emitting diode (LED) or a halogen lamp that generates detection light in one color is used, for example. A single-color projection light source 241 is more advantageous than a white light source in terms of the ease of chromatic aberration correction, for example. Also, a shorter wavelength is advantageous in increasing the resolution in three-dimensional shape data, and thus, a blue light source, such as a blue LED, is desirably used as the projection light source 241. However, a wavelength is selected which enables the image sensor 232 to receive light with good SNR.

Additionally, in the case of using the projection light source 241 of a single color, if the image sensor 232 is a color image sensor, RG photodetectors cannot be used, and only B photodetectors are used, and thus, the number of usable pixels is reduced. Accordingly, in the case of equalized pixel size or number of pixels, a monochrome image sensor is advantageously used as the image sensor 232.

Detection light emitted from the projection light source 241 enters the pattern generation unit 243 through the collector lens 242. Then, detection light emitted from the pattern generation unit 243 is radiated through the light projection lens 244 onto the measurement target object W on the stage 21.

The pattern generation unit 243 is a device for generating patterned light for structured illumination, and is capable of switching between uniform detection light and detection light of a two-dimensional pattern. A digital micromirror device (DMD) or a liquid crystal panel is used for the pattern generation unit 243, for example. The DMD is a display element that has a large number of very small mirrors arranged two-dimensionally and that is capable of switching between a bright state and a dark state on a per-pixel basis by controlling the inclination of each mirror.

A structured illumination method for measuring the three-dimensional shape of a measurement target object W by using the principle of triangulation may be a sinusoidal phase-shifting method, a multi-slit method, a spatial coding method, or the like. The sinusoidal phase-shifting method is an illumination method of projecting a sinusoidal stripe pattern on a measurement target object W, and of acquiring a captured image each time the stripe pattern is moved at a pitch less than the sinusoidal cycle. Three-dimensional shape data is obtained by determining the phase value of each pixel from the luminance value of each captured image and transforming the value into height information.

The multi-slit method is an illumination method of projecting a thin stripe pattern on a measurement target object W, and of acquiring a captured image each time the stripe pattern is moved at a pitch less than the gap between the stripes. Three-dimensional shape data is obtained by determining the capturing timing of maximum luminance of each pixel from the luminance value of each captured image and transforming the timing into height information.

The spatial coding method is an illumination method of sequentially projecting, on a measurement target object W, a plurality of stripe patterns with different stripe widths where the duty ratio of black/white is 50%, and of acquiring captured images. Three-dimensional shape data is obtained by determining the code value of each pixel from the luminance value of each captured image and transforming the value into height information.

The pattern generation unit 243 may generate the stripe patterns mentioned above as two-dimensional patterns. According to the three-dimensional measurement device 1, the multi-slit method and the spatial coding method are used in combination so as to acquire high-resolution three-dimensional shape data with high accuracy.

Also, with the three-dimensional measurement device 1, two light projection units 24 are arranged in a left-right symmetrical manner across the imaging unit 23. Respective light projection axes J2 and J3 of the light projection units 24 are inclined with respect to a light receiving axis J1 of the imaging unit 23 so as to enable use of the principle of triangulation. With the light projection units 24, the light projection axes J2 and J3 are inclined by offsetting the light projection lenses 244 toward the light receiving axis J1 with respect to optical axes of the projection light sources 241, the collector lenses 242, and the pattern generation units 243. By adopting such a configuration, the measurement unit 2 may be downsized compared to a case of causing the entire light projection units 24 to be inclined.

The texture illumination emitting units 25 emit, toward the measurement target object W on the stage 21, uniform illumination light of visible light for detecting the color or the pattern of the measurement target object W as surface texture information. The texture illumination emitting units 25 are arranged to surround the light receiving lens 231 of the imaging unit 23, and the light projection axes of the texture illumination emitting units 25 are substantially parallel to the light receiving axis J1 of the imaging unit 23. Accordingly, in contrast to illumination from the light projection units 24, a shadow is less likely to be formed on the measurement target object W, and the dead angle at the time of capturing is made small.

The control substrate 26 is a circuit board provided with a control circuit for controlling the rotation drive unit 22, a drive circuit for driving the projection light source 241 and the pattern generation unit 243 of the light projection unit 24, a processing circuit for processing a detection signal from the image sensor 232 of the imaging unit 23, and the like.

The controller 4 is a control device for the measurement unit 2, and is configured from a texture light source 41 for generating illumination light for texture illumination, a control substrate 42 provided with a drive circuit for the texture light source 41 and the like, and a power source 43 for supplying power to each device inside the measurement unit 2. The texture light source 41 sequentially illuminates respective illumination light of colors, red (R), green (G), and blue (B), for example, so as to obtain a color texture image from a captured image. Since the image sensor 232 is a monochrome image sensor, in the case of acquiring texture information by using white light source for the texture light source 41, color information cannot be acquired. Accordingly, the texture light source 41 performs illumination by switching among RGB.

Additionally, in a case where a monochrome texture image suffices, a white light source, such as a white LED, or a light source that simultaneously emits single-color light in RGB may be used for the texture light source 41. Moreover, in the case where reduction in measurement accuracy is allowed to a certain extent, a color image sensor may be used for the image sensor 232. Illumination light is transmitted through a light guide 3 to each texture illumination emitting unit 25 of the measurement unit 2. The control substrate 42 and the power source 43 are connected to the control substrate 26 of the measurement unit 2.

The information processing terminal 5 is a terminal device for controlling the measurement unit 2, and performing screen display of a captured image, registration of setting information for dimension measurement, generation of three-dimensional shape data, dimension calculation of a measurement target portion W and the like, and is connected to a display unit 51, a keyboard 52, and a mouse 53. The display unit 51 is a monitor device for displaying a captured image and setting information on a screen. The keyboard 52 and the mouse 53 are input devices used by a user to perform operation input. The information processing terminal is a personal computer, for example, and is connected to the control substrate 26 of the measurement unit 2.

Figure 2:
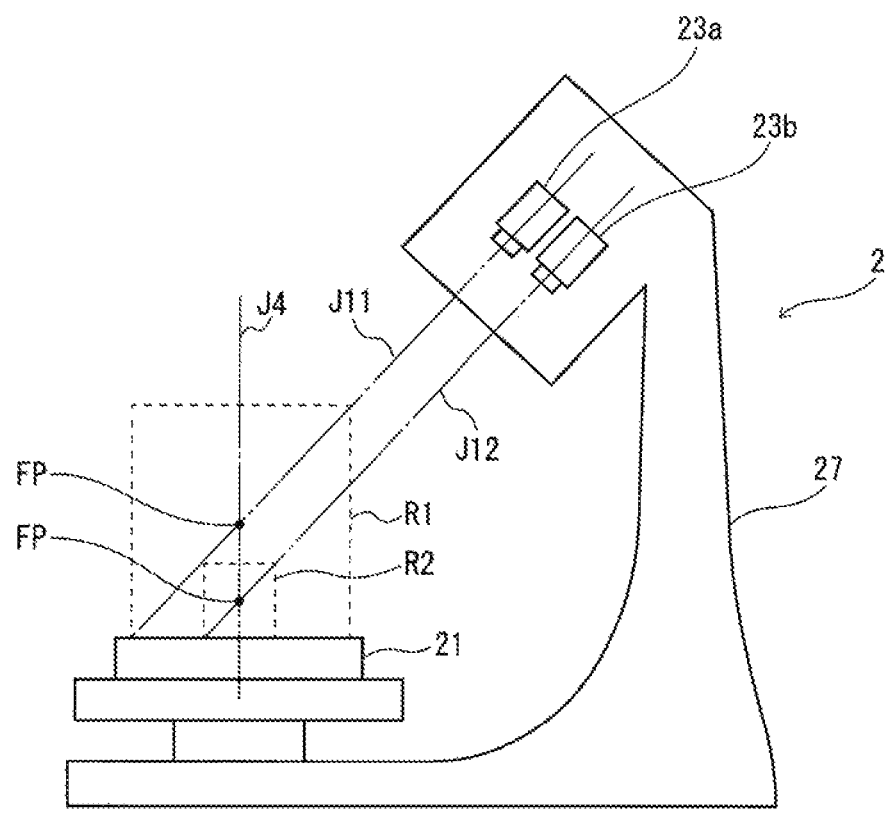
FIG. 2 is an explanatory diagram schematically showing an example configuration of a measurement unit in FIG. 1.

FIG. 2 is an explanatory diagram schematically showing an example configuration of the measurement unit 2 in FIG. 1. The measurement unit 2 includes two imaging units 23a and 23b with different capturing magnifications, and is attached to a base housing 27 in such a way that the relative positional relationship between the stage 21 and the imaging units 23a, 23b does not change. Accordingly, coupling and composition of a plurality of captured images at different rotation angles with respect to the stage 21 are facilitated.

The imaging unit 23a is an imaging unit 23 with low magnification. The imaging unit 23b is an imaging unit 23 with magnification higher than that of the imaging unit 23a. The imaging units 23a and 23b are arranged with the light receiving axes J11 and J12 inclined with respect to the stage 21 so that three-dimensional shape data of the entire measurement target object may be obtained.

For example, inclination angles of the light receiving axes J11 and J12 with respect to the stage 21 are about 45 degrees. Moreover, the imaging unit 23b is arranged below the imaging unit 23a so that a focal position FP of the imaging unit 23b is below a focal position FP of the imaging unit 23a on the rotation axis J4 of the stage 21, and the light receiving axis J12 is substantially parallel to the light receiving axis J11.

By adopting such a configuration, a measurable range R1 of the imaging unit 23a and a measurable range R2 of the imaging unit 23b may be appropriately formed on the stage 21. The measurable ranges R1 and R2 are columnar regions centering on the rotation axis J4 of the stage 21, and the measurable range R2 is formed within the measurable range R1.

Figure 3:
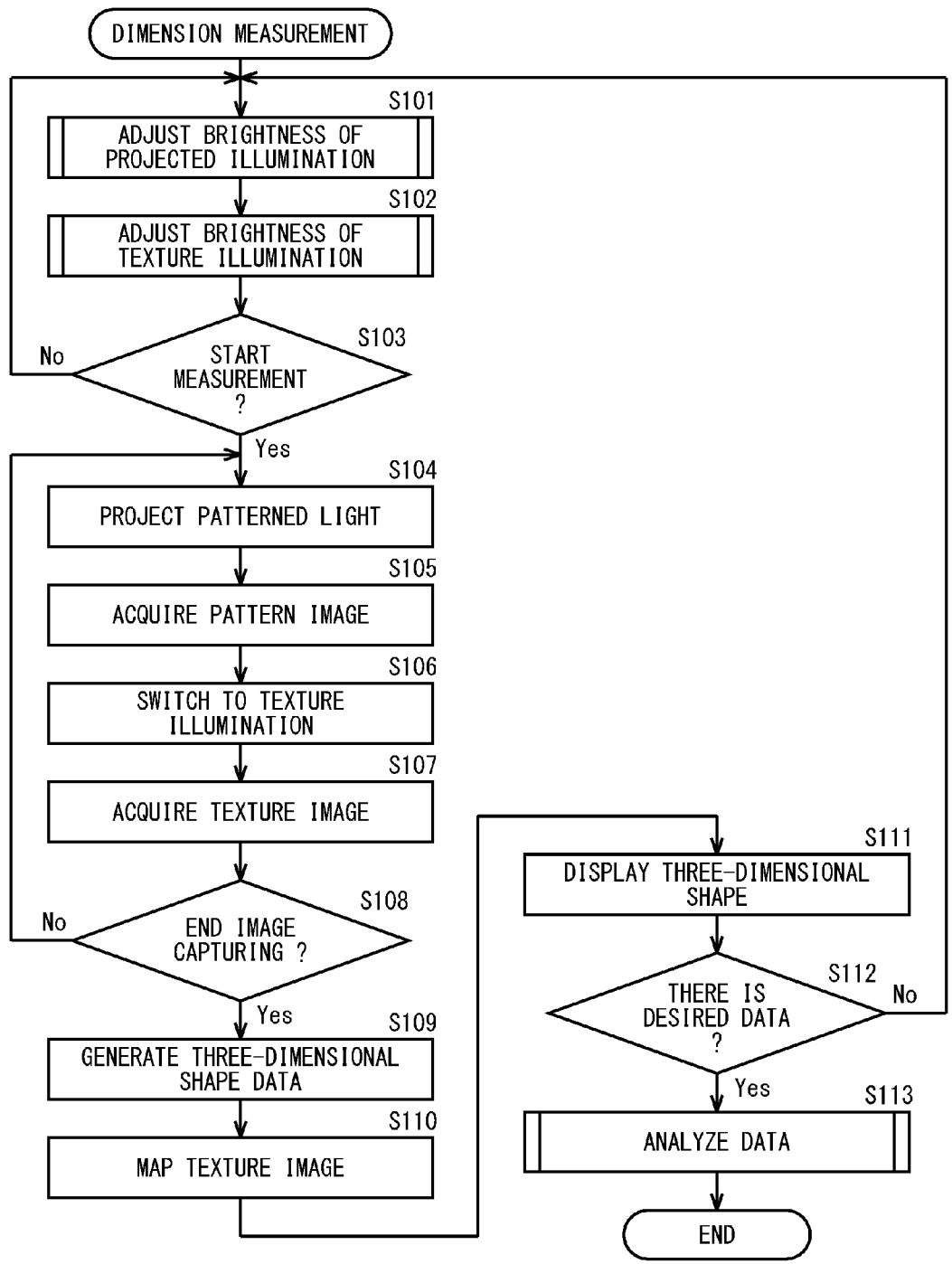
FIG. 3 is a flowchart showing an example of operation at the time of dimension measurement by the three-dimensional measurement device.

FIG. 3 is a flowchart showing, in steps S101 to S113, an example of operation at the time of dimension measurement by the three-dimensional measurement device 1. First, the three-dimensional measurement device 1 captures an image of a measurement target object W placed on the stage 21 by the imaging unit 23, displays the captured image by the display unit 51, and adjusts the brightness of projected illumination (step S101). The brightness adjustment is performed by radiating, from the light projection units 24, uniform detection light or patterned light.

Next, the three-dimensional measurement device 1 switches to texture illumination, acquires a captured image and displays the image by the display unit 51, and adjusts brightness of the texture illumination (step S102). The brightness adjustment is performed by sequentially or simultaneously radiating, from the texture illumination emitting units 25, illumination light of colors, red (R), green (G), and blue (B). The order of steps S101 and S102 may be reversed.

The three-dimensional measurement device 1 repeats the procedure in steps S101 and S102 until illumination conditions are established, and after the illumination conditions are established, if a user indicates that measurement is to be started (step S103), patterned light is projected by the light projection units 24 (step S104), and a pattern image is acquired (step S105). The pattern image is a captured image obtained by capturing an image of the measurement target object W on the stage 21. Projection of patterned light and acquisition of a captured image are performed while synchronizing the pattern generation unit 243 and the imaging unit 23.

Next, the three-dimensional measurement device 1 switches to texture illumination, and acquires a texture image (steps S106, S107). The texture image is obtained by compositing a plurality of captured images acquired by sequentially radiating illumination light of respective colors, red (R), green (G), and blue (B). At the time of continuous measurement, procedure from steps S104 to S107 is repeated while sequentially switching the stage 21 to a plurality of imaging angles designated in advance (step S108).

Next, the three-dimensional measurement device 1 analyzes the pattern image acquired in step S105 by a predetermined measurement algorithm, and generates three-dimensional shape data (step S109). In the step of generating the three-dimensional shape data, pieces of three-dimensional shape data obtained from a plurality of captured images with different imaging angles are synthesized as necessary. Then, the three-dimensional measurement device 1 maps the texture image on the generated three-dimensional shape data (step S110), and displays the result by the display unit 51 as the three-dimensional shape of the measurement target object W (step S111).

The three-dimensional measurement device 1 repeats the procedure from steps S101 to S111 for a desired measurement position until the three-dimensional shape data is obtained, while changing the imaging angles, the capturing conditions, or the like (step S112), and when desired data is obtained and an instruction for data analysis is issued by the user, the three-dimensional measurement device 1 performs data analysis of the three-dimensional shape data by an application program for dimension measurement, and calculates the dimensions of the measurement target object W (step S113).

Figure 4:
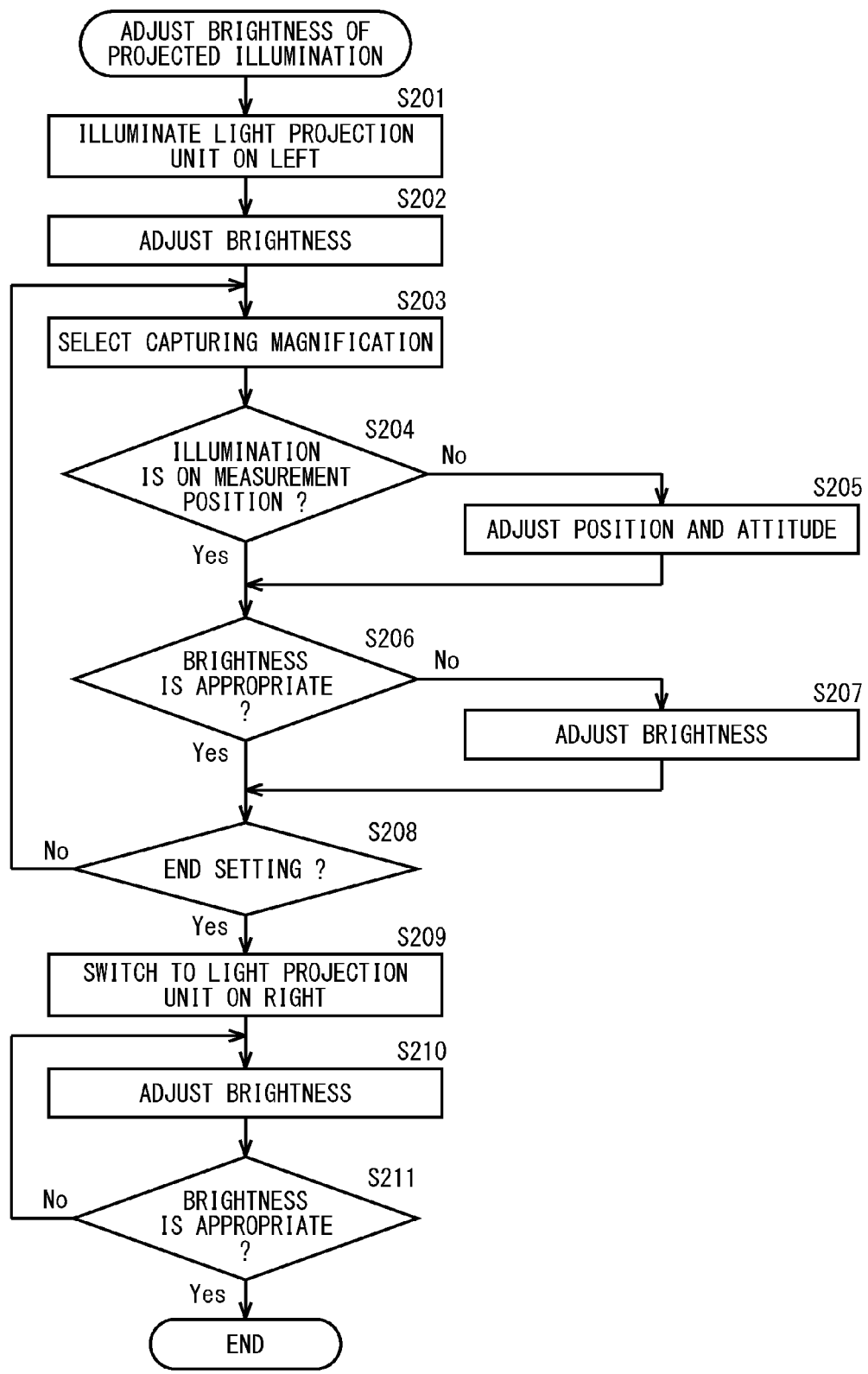
FIG. 4 is a flowchart showing an example of detailed operation of step S101 (adjustment of brightness of projected illumination) in FIG. 3.

FIG. 4 is a flowchart showing, in steps S201 to S211, an example of detailed operation of step S101 (adjustment of brightness of projected illumination) in FIG. 3, and shows an operation of the three-dimensional measurement device 1. First, the three-dimensional measurement device 1 illuminates the light projection unit 24 on the left (step S201), and receives adjustment of brightness by the user (step S202).

Next, the three-dimensional measurement device 1 receives selection of capturing magnification by the user, and when the capturing magnification is changed, the three-dimensional measurement device 1 switches to the corresponding imaging unit 23 (step S203). At this time, if illumination is not on the desired measurement position, the three-dimensional measurement device 1 rotates the stage 21 based on a user operation, and adjusts the position and the attitude of the measurement target object W (steps S204, S205). Adjustment of the position and the attitude may be performed while illuminating the light projection units 24 on the left and the right at the same time.

Then, if the brightness at the measurement position is not appropriate, the three-dimensional measurement device 1 again receives adjustment of brightness by the user (steps S206, S207). The three-dimensional measurement device 1 repeats the procedure from steps S203 to S207 until the user indicates end of setting (step S208).

Next, when end of setting is indicated by the user, the three-dimensional measurement device 1 registers illumination conditions designated by the user as setting information, and switches to the light projection unit 24 on the right (step S209), and receives adjustment of brightness by the user (step S210). The three-dimensional measurement device 1 repeats the procedure in step S210 until end of setting is indicated by the user, and when end of setting is indicated by the user, illumination conditions designated by the user are registered as setting information, and the process is ended (step S211).

Figure 5:
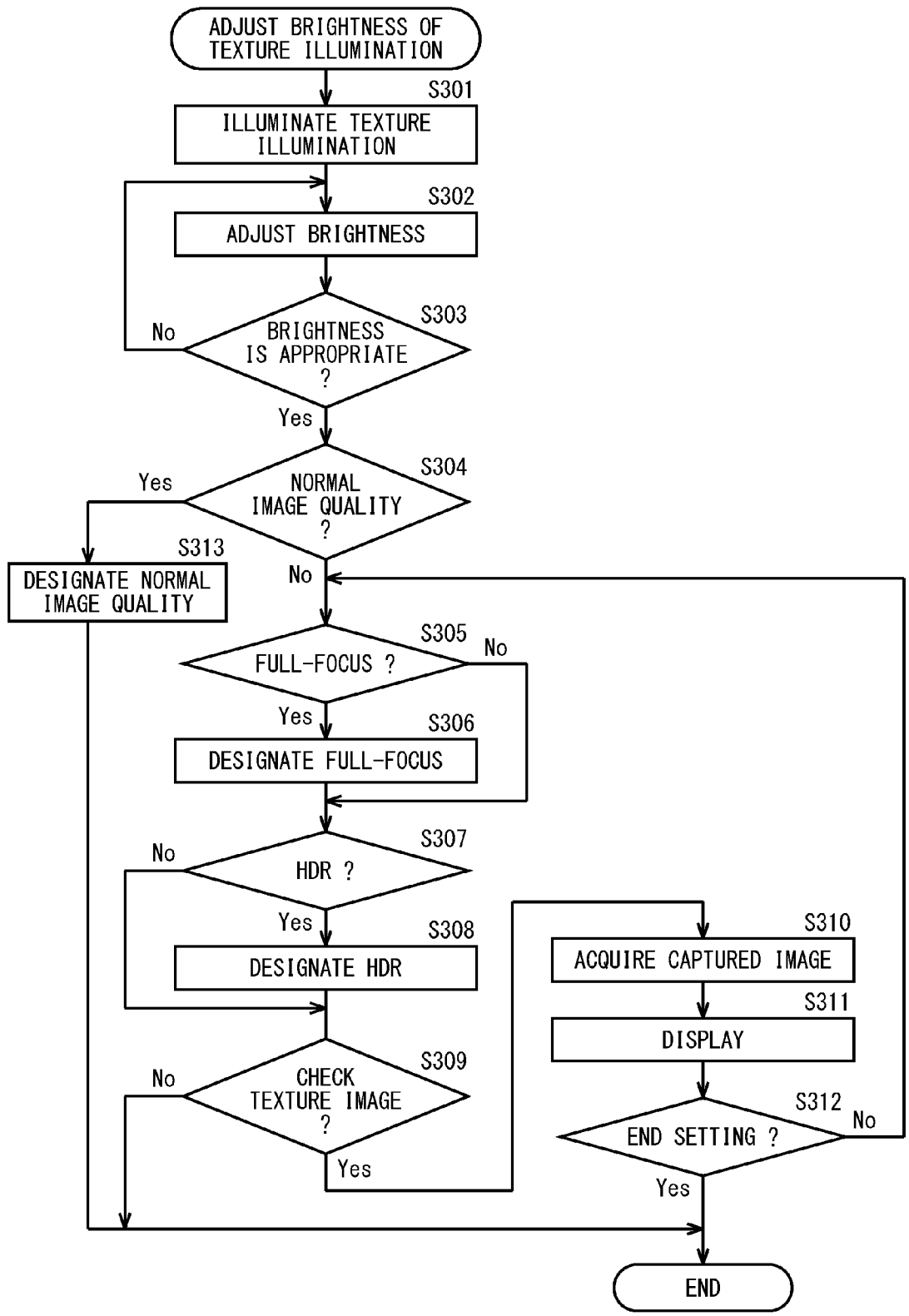
FIG. 5 is a flowchart showing an example of detailed operation of step S102 (adjustment of brightness of texture illumination) in FIG. 3.

FIG. 5 is a flowchart showing, in steps S301 to S313, an example of detailed operation of step S102 (adjustment of brightness of texture illumination) in FIG. 3, and shows an operation of the three-dimensional measurement device 1. First, the three-dimensional measurement device 1 illuminates texture illumination (step S301), and receives adjustment of brightness by the user (step S302). If the brightness at a measurement portion is not appropriate (step S303), the three-dimensional measurement device 1 repeats the procedure in step S302, and receives again adjustment of brightness by the user.

Next, the three-dimensional measurement device 1 receives selection of image quality of a texture image by the user (step S304), and if normal image quality is selected, the three-dimensional measurement device 1 designates the normal image quality, registers, as setting information, the illumination conditions and the capturing conditions designated by the user, and ends the process (step S313).

On the other hand, if full-focus image quality is selected by the user, the three-dimensional measurement device 1 designates the full-focus image quality (steps S305, S306). The full-focus image quality is image quality that is achieved by a depth composition process, and an entirely focused image can be obtained by compositing a plurality of captured images which are acquired while changing the focal position.

Then, when high dynamic range (HDR) image quality is selected by the user, the three-dimensional measurement device 1 designates the HDR image quality (steps S307, S308). According to the HDR image quality, a high dynamic range image can be obtained by synthesizing a plurality of captured images which are acquired while changing the exposure time.

Next, when checking of a texture image is indicated by the user (step S309), the three-dimensional measurement device 1 acquires a captured image based on the illumination conditions and the capturing conditions designated by the user (step S310), creates a texture image and displays the image by the display unit 51 (step S311).

The three-dimensional measurement device 1 repeats the procedure from steps S305 to S311 until end of setting is indicated by the user, and when end of setting is indicated by the user, the three-dimensional measurement device 1 registers, as setting information, the illumination conditions and the capturing conditions designated by the user, and ends the process (step S312).

Figure 6:
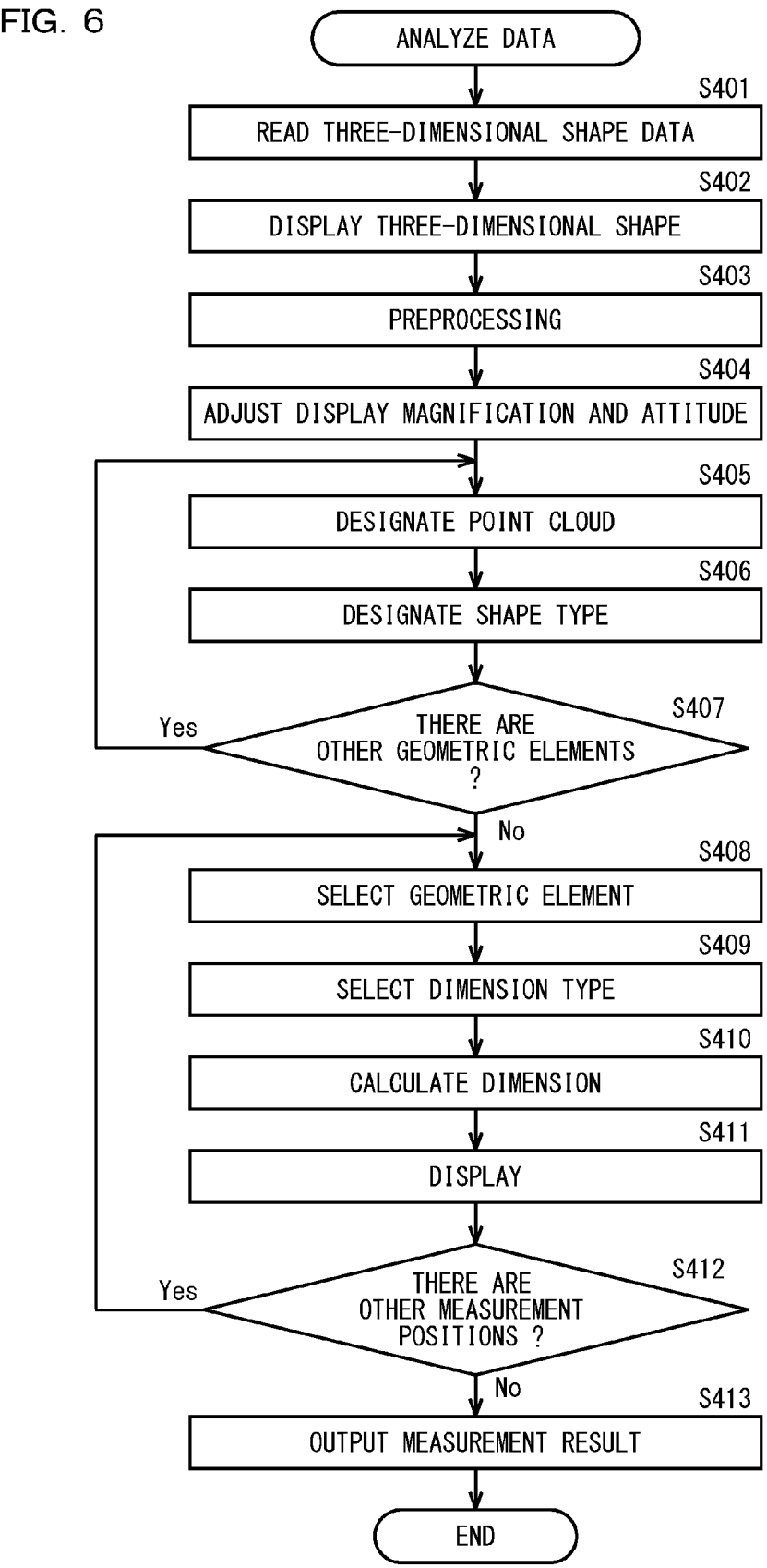
FIG. 6 is a flowchart showing an example of detailed operation of step S113 (data analysis) in FIG. 3.

FIG. 6 is a flowchart showing, in steps S401 to S413, an example of detailed operation of step S113 (data analysis) in FIG. 3, and shows an operation of the three-dimensional measurement device 1. First, the three-dimensional measurement device 1 reads, based on a user operation, three-dimensional shape data according to a predetermined data format, and displays the three-dimensional shape of the measurement target object W by the display unit 51 (steps S401, S402).

Next, the three-dimensional measurement device 1 performs preprocessing such as noise removal, filling, deletion of unnecessary data, and the like (step S403), and receives adjustment of display magnification and attitude by the user (step S404).

Next, the three-dimensional measurement device 1 receives designation of a point cloud, from the three-dimensional shape being displayed, for extracting a geometric element at the measurement position (step S405). Then, the three-dimensional measurement device 1 receives designation of a shape type for the geometric element (step S406). The shape type may be a point, a line, a circle, a plane, a sphere, a cylinder, a cone, or the like. The order of steps S405 and S406 may be reversed.

The three-dimensional measurement device 1 repeats the procedure in steps S405 and S406 until designation of a point cloud and the shape type is complete for all the geometric elements (step S407), and when designation of a point cloud and the shape type is complete, selection of a geometric element by the user is received (step S408). Then, the three-dimensional measurement device 1 receives selection of a dimension type for the selected geometric element (step S409). The dimension type may be a distance, an angle, a geometric tolerance, a diameter, or the like. The order of steps S408 and S409 may be reversed.

Next, the three-dimensional measurement device 1 specifies a geometric element by fitting a basic shape with a point cloud for the selected geometric element, and calculates a dimension value between the geometric elements (step S410). Then, the three-dimensional measurement device 1 displays the dimension value in association with the measurement position on the three-dimensional shape of the measurement target object W (step S411). If there are other desired measurement positions, the three-dimensional measurement device 1 repeats the procedure from steps S408 to S411 (step S412), and if there are no other desired measurement positions, the three-dimensional measurement device 1 outputs the measurement result, and ends the process (step S413).

Next, a further detailed configuration of the three-dimensional measurement device 1 according to the present invention will be described below with reference to FIGS. 7 to 14.

<Information Processing Terminal 5>

Figure 7:
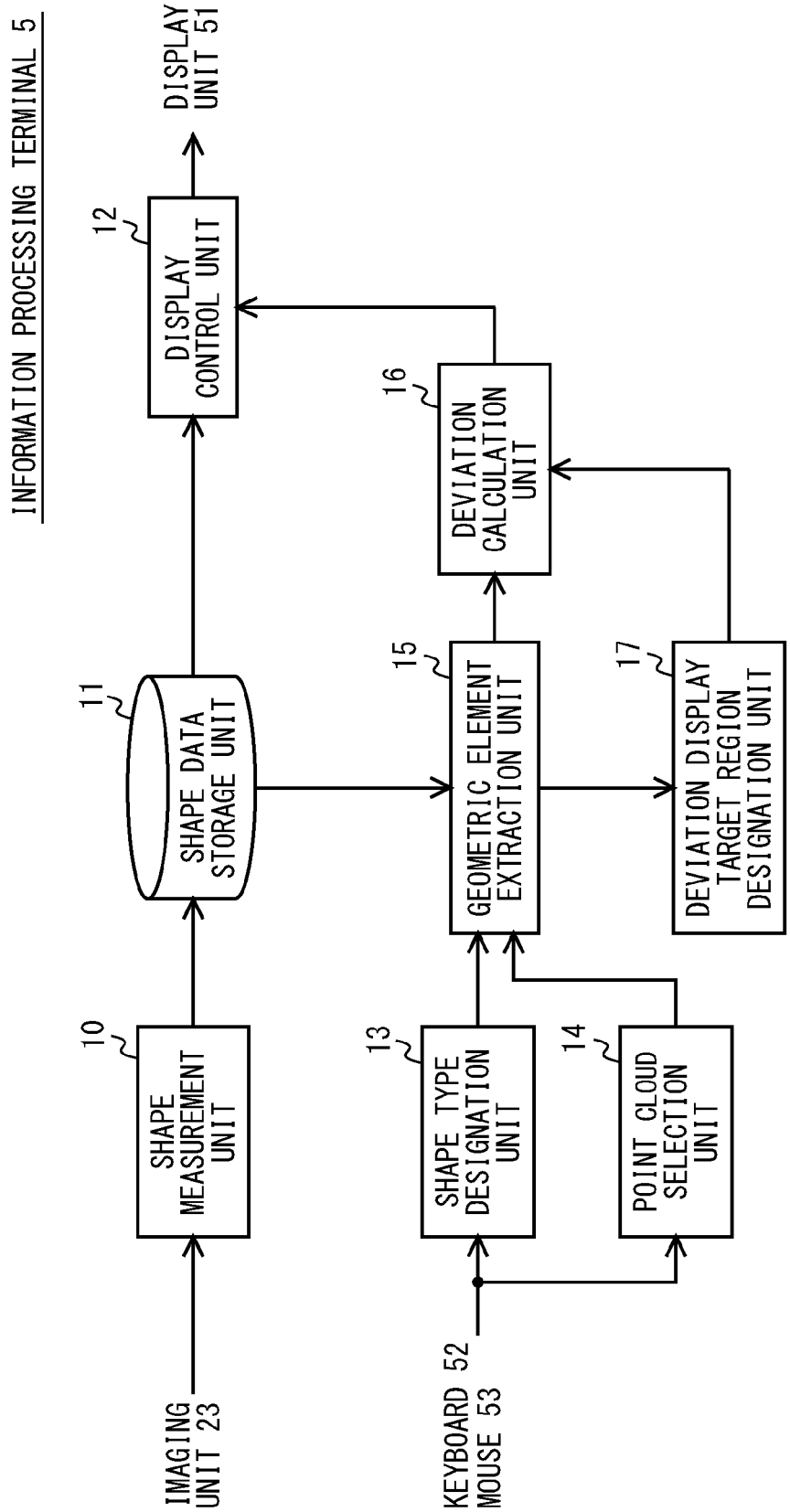
FIG. 7 is a block diagram showing an example of a functional configuration of an information processing terminal in FIG. 1.

FIG. 7 is a block diagram showing an example of a functional configuration of the information processing terminal 5 in FIG. 1. The information processing terminal 5 is configured from a shape measurement unit 10, a shape data storage unit 11, a display control unit 12, a shape type designation unit 13, a point cloud selection unit 14, a geometric element extraction unit 15, a deviation calculation unit 16, and a deviation display target region designation unit 17.

The shape measurement unit 10 measures position information of a plurality of measurement points in a three-dimensional space, and generates a point cloud representing the three-dimensional shape of the measurement target object W. A point cloud corresponds to a plurality of measurement points. The shape measurement unit 10 is a shape data generation unit for generating, as the point cloud, three-dimensional shape data containing position information of a large number of measurement points. The generated three-dimensional shape data is stored in the shape data storage unit 11. For example, the three-dimensional shape data is created based on a captured image acquired from the imaging unit 23 of the measurement unit 2.

The display control unit 12 controls the display unit 51 based on the three-dimensional shape data in the shape data storage unit 11, and displays the three-dimensional shape of the measurement target object W. For example, the three-dimensional shape is displayed on the screen of the display unit 51 in such a manner that an object body having a large number of measurement points which are arranged three-dimensionally is seen from a predetermined point of view. The position of the three-dimensional shape (object body) on the screen, the point of view, and the display magnitude may be arbitrarily designated.

The shape type designation unit 13 receives designation of the type of a basic shape with respect to a geometric element that is an extraction target. Basic shapes that can be designated include a point, a straight line, a circle, a plane, a cylinder surface, a cone surface, a sphere surface, and the like, and an arbitrary shape type is designated based on a user operation by the keyboard 52 or the mouse 53.

The point cloud selection unit 14 selects, on a three-dimensional shape being displayed, a point cloud for extracting a geometric element. A point cloud consists of at least two measurement points, and is selected based on designation, of a position on the three-dimensional shape, which has been received based on a user operation by the keyboard 52 or the mouse 53. For example, a point cloud is selected by designating, by mouse operation or the like, a figure, such as a polygon, enclosing a desired point cloud on the screen. Furthermore, by designating one position on the three-dimensional shape on the screen by mouse operation or the like, a point cloud including the position and fitting the basic shape of a shape type designated by the user is selected.

The geometric element extraction unit 15 specifies a geometric element as a basic shape that is fitted with the point cloud selected by the point cloud selection unit 14. For example, the geometric element extraction unit 15 specifies a first geometric element that fits a first point cloud selected by the point cloud selection unit 14, and specifies a second geometric element that fits a second point cloud selected by the point cloud selection unit 14.

A well-known statistical method may be used as the method for fitting the basic shape of a shape type designated by a user with a point cloud. For example, the three-dimensional position, the attitude, and the size of a geometric element are specified by a least squares method based on distances between the measurement points constituting the point cloud and the basic shape.

The deviation calculation unit 16 determines, for a measurement point included in the point cloud selected by the point cloud selection unit 14, a deviation from a geometric element specified by the geometric element extraction unit 15. When a first geometric element is specified from the first point cloud, and a second geometric element is specified from the second point cloud, the deviation calculation unit 16 determines first deviations from the first geometric element with respect to the first point cloud, and determines second deviations from the second geometric element with respect to the second point cloud.

In the case where the geometric element is a plane, the deviation calculation unit 16 determines a deviation in the normal direction of the plane. That is, the deviation is determined based on the distance between the plane and a measurement point. Also, the sign of the deviation is determined based on whether the measurement point is outside the plane or inside the plane.

In the case where the geometric element is a cylinder, a deviation in the normal direction of the side surface of the cylinder is determined. In the case where the geometric element is a cone, the deviation in the normal direction of the side surface of the cone is determined. In the case where the geometric element is a sphere, the deviation in the normal direction of the surface of the sphere is determined.

The deviation display target region designation unit 17 designates a deviation display target region including a geometric element specified by the geometric element extraction unit 15. For example, if a geometric element extracted from a point cloud is a plane, the geometric element is made a reference surface, and a region sandwiched between two planes that are offset above and below in the normal direction of the reference surface (plane) by a distance the same as a color assignment range width is designated as the deviation display target region.

If the geometric element extracted from a point cloud is a cylinder, a region sandwiched between two cylindrical surfaces that are offset in the normal direction of the reference surface (cylinder surface), that is, the radial direction, by a distance the same as the color assignment range width is designated as the deviation display target region. If the geometric element extracted from a point cloud is a cone, a region sandwiched between two conical surfaces that are offset in the normal direction of the reference surface (cone surface), that is, a direction perpendicular to the generating line, by a distance the same as the color assignment range width is designated as the deviation display target region. If the geometric element extracted from a point cloud is a sphere, a region sandwiched between two spherical surfaces that are offset in the normal direction of the reference surface (spherical surface), that is, the radial direction, by a distance the same as the color assignment range width is designated as the deviation display target region.

When a first geometric element and a second geometric element are designated as reference surfaces for deviation calculation, the deviation display target region designation unit 17 designates each of a deviation display target region including the first geometric element and a deviation display target region including the second geometric element.

The display control unit 12 superimposes and displays, on a three-dimensional shape, a distribution of deviations taking a geometric element as a reference surface. The display control unit 12 superimposes and displays, on a three-dimensional shape, a distribution of first deviations from the first geometric element and a distribution of second deviations from the second geometric element.

To prevent a deviation from being displayed for a part other than the geometric element designated by a user as reference surface for deviation display, the display control unit 12 displays the deviation distribution by taking a measurement point in the deviation display target region as the display target. That is, the display control unit 12 displays the distribution of the first deviations from the first geometric element with respect to the first point cloud in the deviation display target region, and displays the distribution of the second deviations from the second geometric element with respect to the second point cloud in the deviation display target region.

Furthermore, the display control unit 12 displays the deviation distribution by assigning different colors to measurement points according to the deviations determined by the deviation calculation unit 16. Specifically, the distribution of the first deviations is displayed by assigning different colors to the first point cloud according to the first deviations. Also, the distribution of the second deviations is displayed by assigning different colors to the second point cloud according to the second deviations. For example, color assignment is performed by using a color table indicating a correspondence relationship between a deviation value and a display color.

Moreover, color assignment according to the deviation is performed in a range taking an upper limit value of deviation as the deviation upper limit and a lower limit value of deviation as the deviation lower limit, and a single color is assigned to a deviation exceeding the deviation upper limit or a deviation below the deviation lower limit.

Moreover, in the case where deviation display target regions designated for two respective reference surfaces are partially overlapped with each other, deviation display may be performing for the point clouds in the overlapped region by combining colors, or display of the deviations may be omitted. Also, geometric elements designated as the reference surfaces may be prioritized, and deviation display may be performed according to the priority order for the point clouds in the overlapped region. For example, coloring of the geometric element registered first as the reference surface is prioritized.

Figure 8:
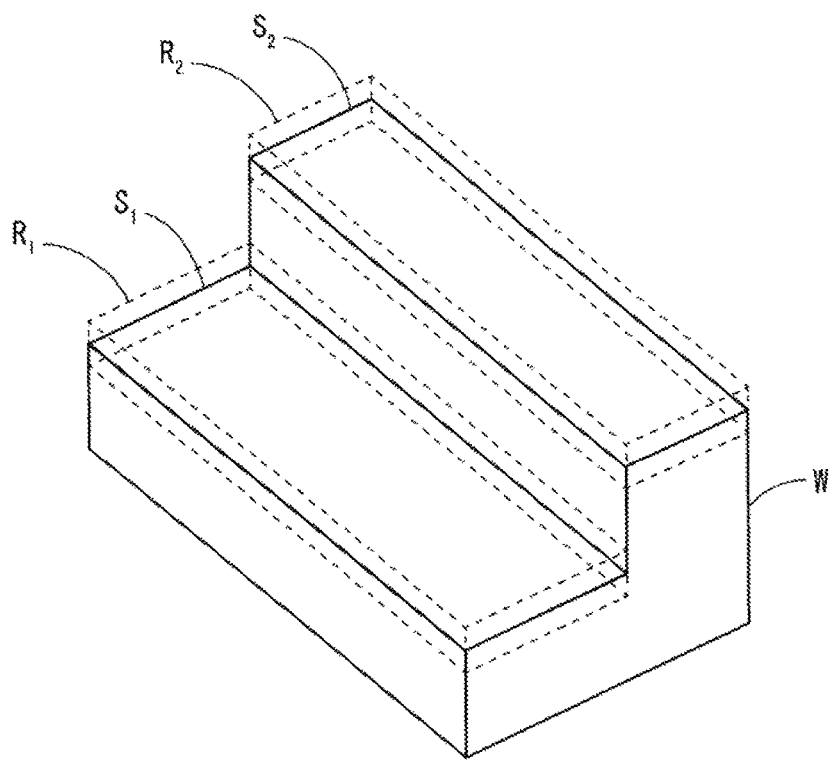
FIG. 8 is a diagram showing an example of operation at the time of displaying a deviation distribution at the information processing terminal in FIG. 7, and shows deviation display target regions for limiting display targets of a deviation distribution.

FIG. 8 is a diagram showing an example of operation at the time of displaying a deviation distribution at the information processing terminal 5 in FIG. 7, and shows deviation display target regions $R_1$ and $R_2$ for limiting display targets of a deviation distribution. The drawing shows a three-dimensional shape of a measurement target object W which is displayed on a screen. The measurement target object W has stair-like steps, and two rectangular planes, that is, an upper surface $S_1$ of the lower step and an upper surface $S_2$ of an upper step, are each designated as the reference surface.

The deviation display target region $R_1$ is a cuboid region sandwiched between rectangular planes which are offset, from the upper surface $S_1$ of the lower step, in the positive normal direction by the deviation upper limit for color assignment and in the negative normal direction by an absolute value of the deviation lower limit for color assignment. The deviation display target region $R_2$ is a cuboid region sandwiched between rectangular planes which are offset, from the upper surface $S_2$ of the upper step, in the positive normal direction by the deviation upper limit for color assignment and in the negative normal direction by the absolute value of the deviation lower limit for color assignment.

Display of the deviation distribution is performed for measurement points included in such deviation display target regions $R_1$ and $R_2$. The amount of offset used for designation of the deviation display target region on the reference surface is not limited to the deviation upper limit and the deviation lower limit as described above, and any value set in advance may be used. Also, the amount of offset may be a fixed value, or may be arbitrarily designated by a user.

Figure 9:
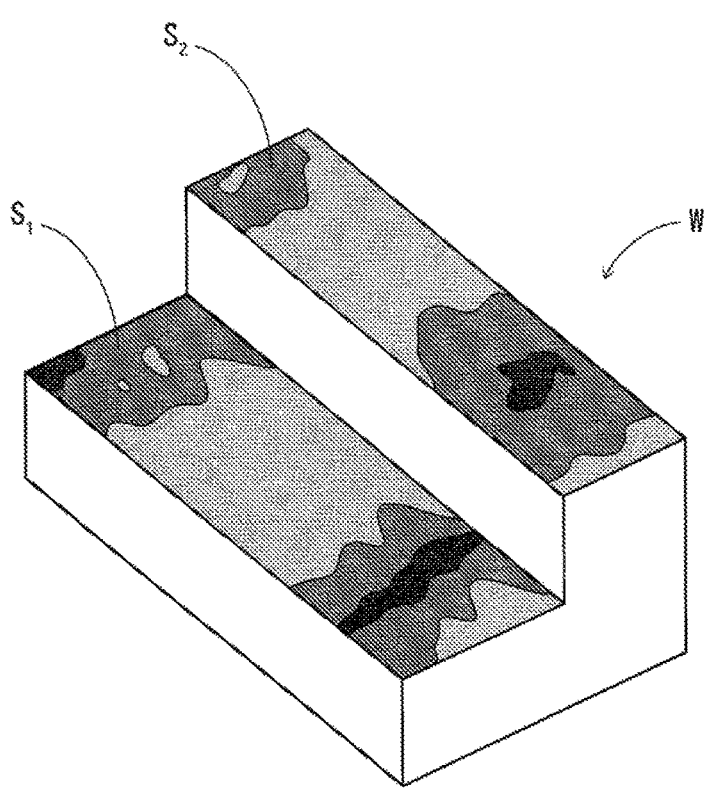
FIG. 9 is a diagram showing an example of operation at the time of displaying a deviation distribution at the information processing terminal in FIG. 7, and shows deviation distributions for upper surfaces of a measurement target object.

FIG. 9 is a diagram showing an example of operation at the time of displaying a deviation distribution at the information processing terminal 5 in FIG. 7, and shows deviation distributions for the upper surfaces $S_1$ and $S_2$ of the measurement target object W. In the drawing, a deviation distribution where the upper surface $S_1$ of the lower step is taken as the reference surface, and a deviation distribution where the upper surface $S_1$ of the upper step is taken as the reference surface are displayed superimposed on the three-dimensional shape.

As described above, a plurality of geometric elements may each be designated as a reference surface, and a plurality of deviation distributions may be simultaneously displayed on a three-dimensional shape in association with the reference surfaces. Accordingly, the degree of undulation of a shape may be easily compared for a plurality of geometric elements on a three-dimensional shape. Also, the deviation distribution display target is limited to measurement points in a deviation display target region which is designated for each reference surface, and thus, a three-dimensional shape may be prevented from becoming unrecognizable due to parts other than a geometric element designated as the reference surface being solidly colored.

Figure 10:
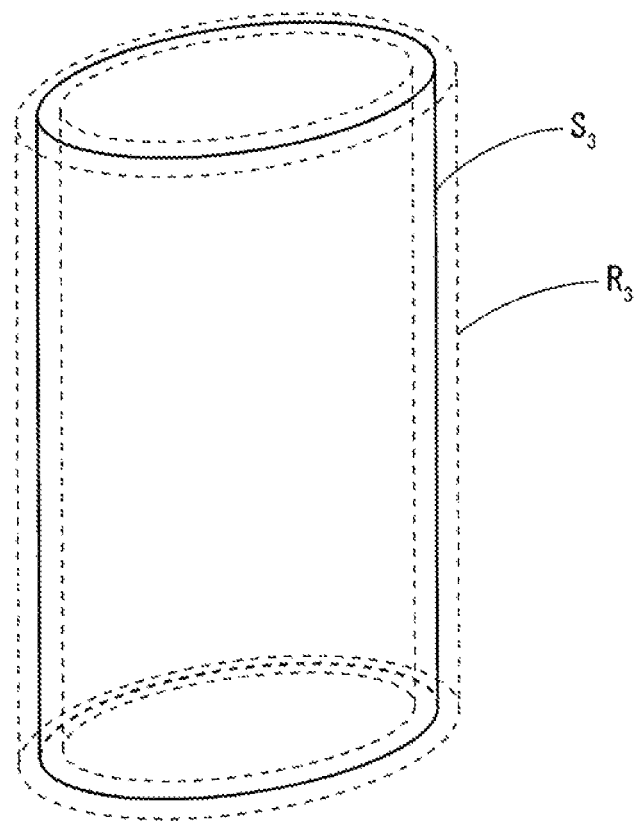
FIG. 10 is a diagram showing an example of operation at the time of displaying a deviation distribution at the information processing terminal in FIG. 7, and shows a deviation display target region designated for a side surface of a cylinder.

FIG. 10 is a diagram showing an example of operation at the time of displaying a deviation distribution at the information processing terminal 5 in FIG. 7, and shows a deviation display target region $R_3$ designated for a side surface $S_3$ of a cylinder. The deviation display target region $R_3$ in a case where the side surface $S_3$ of a cylinder is designated as the reference surface is a region sandwiched between cylindrical surfaces which are offset, from the side surface $S_3$, in the positive normal direction by the deviation upper limit for color assignment and in the negative normal direction by the absolute value of the deviation lower limit for color assignment. Display of the deviation distribution is performed for measurement points included in the deviation display target region $R_3$, and deviation display is not performed for measurement points outside the deviation display target region $R_3$.

Figure 11:
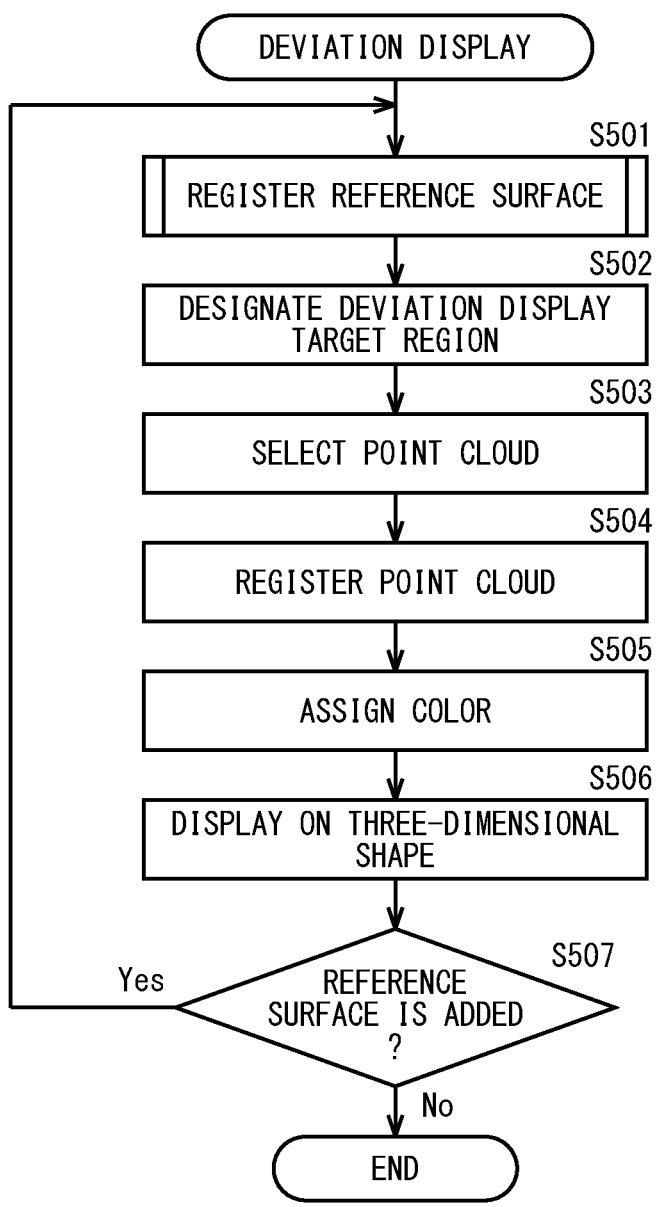
FIG. 11 is a flowchart showing an example of operation at the time of displaying a deviation distribution at the information processing terminal in FIG. 7.

FIG. 11 is a flowchart showing, in steps S501 to S507, an example of operation at the time of displaying a deviation distribution at the information processing terminal 5 in FIG. 7. First, the information processing terminal 5 registers a reference surface where, a deviation distribution is to be determined, for a three-dimensional shape being displayed on the screen of the display unit 51 (step S501). The process of registration of a reference surface is performed by selecting a point cloud on a three-dimensional shape, and extracting a geometric element.

Next, the information processing terminal 5 designates a deviation display target region for the registered reference surface so as to limit the deviation display target (step S502). The deviation display target region is a region including the reference surface, and the deviation display target is limited to point clouds close to the reference surface.

The information processing terminal 5 selects a point cloud consisting of a large number of measurement points in the designated deviation display target region, and registers the point cloud as the deviation display target (steps S503, S504). The process of selecting a point cloud is performed based on distances between measurement points and the reference surface.

Next, the information processing terminal 5 assigns, to the registered point cloud, colors which are different according to the deviations, and stores color assignment information as a deviation color map (step S505). The information processing terminal 5 displays a deviation distribution on the three-dimensional shape in association with the reference surface according to the deviation color map (step S506). The process of displaying the deviation distribution is performed by coloring the registered point cloud with colors according to the deviation color map. If a reference surface is added, the procedure from steps S501 to S506 is repeated (step S507).

Figure 12:
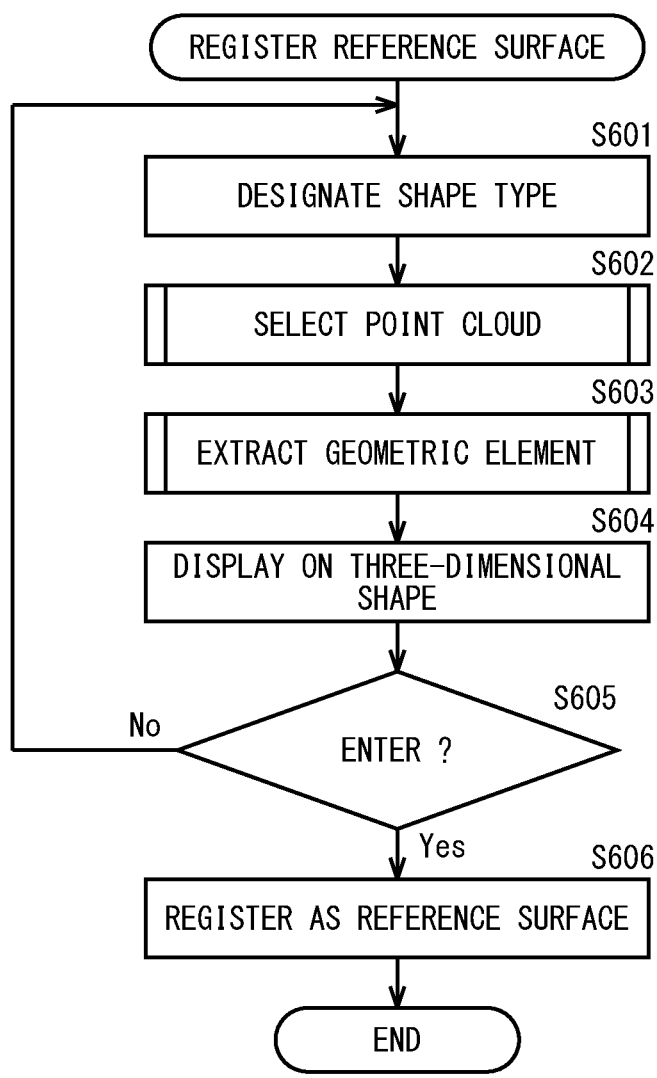
FIG. 12 is a flowchart showing an example of detailed operation of step S501 (registration of reference surface) in FIG. 11.

FIG. 12 is a flowchart showing, in steps S601 to S606, an example of detailed operation of step S501 (registration of reference surface) in FIG. 11, and shows an operation of the information processing terminal 5. First, when a shape type is designated by a user (step S601), the information processing terminal 5 selects a point cloud for extracting a geometric element of the designated shape type on the three-dimensional shape (step S602). Designation of a shape type is performed by mouse operation or the like.

Next, the information processing terminal 5 extracts a geometric element by fitting a basic shape with the selected point cloud (step S603). The information processing terminal 5 displays the extracted geometric element on the three-dimensional shape (step S604). The information processing terminal 5 repeats the procedure from steps S601 to S604 until an enter operation by the user is detected (step S605), and when the enter operation is detected, the extracted geometric element is registered as the deviation distribution display target (step S606).

Figure 13:
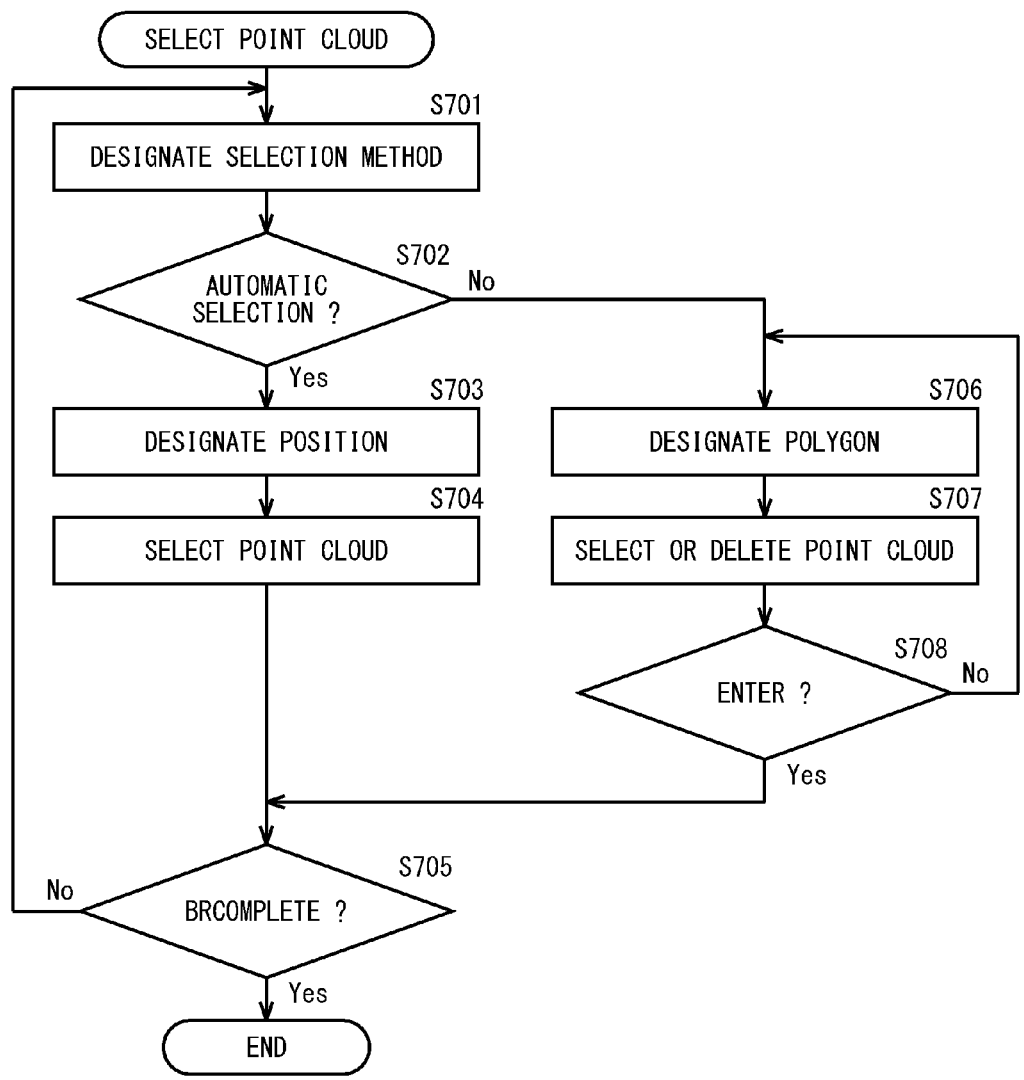
FIG. 13 is a flowchart showing an example of detailed operation of step S602 (selection of point cloud) in FIG. 12.

FIG. 13 is a flowchart showing, in steps S701 to S708, an example of detailed operation of step S602 (selection of point cloud) in FIG. 12, and shows an operation of the information processing terminal 5. First, the information processing terminal 5 receives designation of a selection method for a point cloud by the user (step S701).

Next, the information processing terminal 5 selects a point cloud for extracting a geometric element, according to the designated selection method. That is, in the case where automatic selection is designated, when a position on the three-dimensional shape is designated by the user (steps S702, S703), the information processing terminal 5 automatically identifies a point cloud that includes the designated position and that fits the basic shape of the shape type designated in step S601, and selects the point cloud (step S704). A position on the three-dimensional shape is designated by mouse operation or the like. In the automatic identification process for a point cloud, a basic shape including a position designated by a user is estimated by fitting, and a point cloud close to the estimated basic shape is extracted.

On the other hand, in the case where automatic selection is not designated, when a polygon is designated by the user on the three-dimensional shape (steps S702, S706), the information processing terminal 5 selects or deletes a point cloud included in the designated polygon (step S707). The information processing terminal 5 repeats the procedure in steps S706 and S707 until an enter operation by the user is detected (step S708). Next, the information processing terminal 5 repeats the procedure from step S701 until a point cloud selection process is complete, and when the selection process is complete, the process is ended (step S705).

Figure 14:
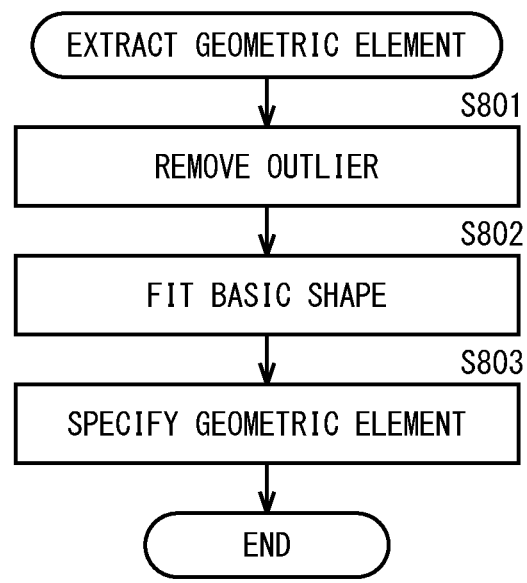
FIG. 14 is a flowchart showing an example of detailed operation of step S603 (extraction of geometric element) in FIG. 12.
Figure 15A:
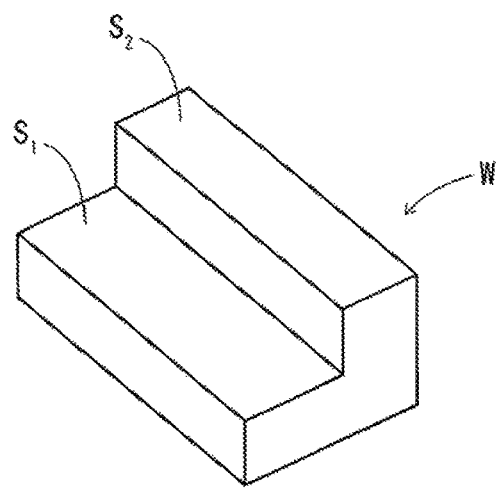
FIGS. 15A to 15C are diagrams showing operation of a conventional three-dimensional measurement device.
Figure 15B:
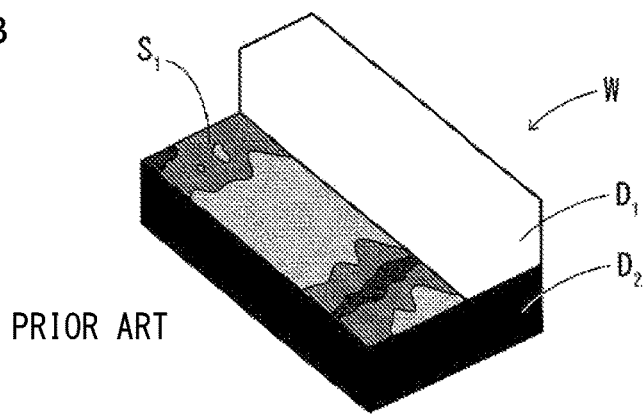
Figure 15C:
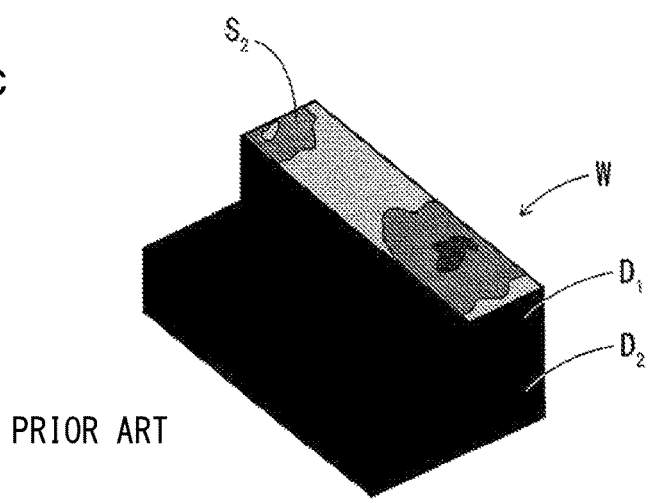

FIG. 14 is a flowchart showing, in steps S801 to S803, an example of detailed operation of step S603 (extraction of geometric element) in FIG. 12, and shows an operation of the information processing terminal 5. First, the information processing terminal 5 removes an outlier from the selected point cloud (step S801).

A well-known statistical method may be used for the process of removing an outlier. For example, the basic shape of the shape type designated in step S601 is extracted, by fitting, from the selected point cloud, and a distance between a vertex of the point cloud and the basic shape or an angle difference between the normal line of a vertex and the normal line of the basic shape is compared with a predetermined threshold, and a vertex which is an outlier is thereby determined and is removed from the point cloud for extracting a geometric element.

Next, the information processing terminal 5 extracts, by fitting, the basic shape of the shape type designated in step S601 from the selected point cloud (step S802), and specifies a geometric element from the extracted basic shape (step S803). Additionally, step S801 for removing an outlier from a selected point cloud may be omitted.

According to the present embodiment, a distribution of first deviations from a first geometric element and a distribution of second deviations from a second geometric element are superimposed and displayed on a three-dimensional shape, and thus, the degree of undulation may be compared for a plurality of geometric elements on the three-dimensional shape. In particular, because a deviation distribution display target is limited to within a deviation display target region including a geometric element, the three-dimensional shape of a part different from a geometric element for which the deviation is to be determined may be prevented from becoming unrecognizable due to display of a deviation distribution. Also, a deviation distribution may be displayed for a geometric element regardless of whether the geometric element extracted from a point cloud is a cylinder, a cone, or a sphere.

Additionally, in the present embodiment, an example is described for a case where three-dimensional shape data is acquired by optically measuring the shape of a measurement target object W, but the method for acquiring three-dimensional shape data is not limited to such a method. For example, the present invention is also applicable to a contact-type measurement instrument which measures the three-dimensional shape by causing a probe to contact a measurement target object W.

What is claimed is:

1. A three-dimensional measurement device comprising:
    a shape measurement unit configured to measure respective three-dimensional positions of a plurality of measurement points in a three-dimensional space, and to generate a point cloud representing a three-dimensional shape of a measurement target object from the respective three-dimensional positions;
    a display configured to display the three-dimensional shape of the measurement target object based on the point cloud;
    a selector configured to receive a position on the three-dimensional shape displayed by the display, and to select, based on the position on the three-dimensional shape, a subset of the point cloud, a first subset of the point cloud selected, based on a first position received as the position by the selector, and a second subset of the point cloud selected, based on a second position received as the position by the selector, the second position being different from the first position;
    an extractor configured to determine, as a first reference surface, a first geometric element of a basic shape fitting the first subset of the point cloud selected by the selector, and determine, as a second reference surface, a second geometric element of a basic shape fitting the second subset of the point cloud selected by the selector;
    a calculator configured to determine first deviations of the first subset of the point cloud with respect to the first reference surface along a normal direction of the first reference surface, and second deviations of the second subset of the point cloud with respect to the second reference surface along a normal direction of the first reference surface; and,
    a display controller configured to control the display to display, on the three-dimensional shape, both a distribution of the first deviations with respect to the first reference surface and a distribution of the second deviations with respect to the second reference surface.

2. The three-dimensional measurement device according to claim 1, further comprising a region designator configured to designate a first parameter, along the normal direction of the first reference surface, representing a first deviation display target region including the first reference surface,
    wherein the display controller is configured to control the display to display the distribution of the first deviations with respect to the first reference surface within the first deviation display target region designated by the first parameter.

3. The three-dimensional measurement device according to claim 2, wherein the region designator is configured to further designate a second parameter, along the normal direction of the second reference surface, representing a second deviation display target region including the second reference surface,
    wherein the display controller is configured to control the display to display the distribution of the second deviations with respect to the second reference surface within the second deviation display target region designated by the second parameter.

4. The three-dimensional measurement device according to claim 1, further comprising a shape type designation unit for receiving designation of a type of the basic shape with respect to the first reference surface,
    wherein the extractor is configured to determine the first reference surface based on the designation of the type of the basic shape with respect to the first reference surface,
    wherein the basic shape is a plane, a cylinder, a cone, or a sphere, and wherein the calculator unit determines deviations in a normal direction from a surface of the plane, a side surface of the cylinder, a side surface of the cone, or a surface of the sphere.

5. The three-dimensional measurement device according to claim 1, wherein the display controller is configured to control the display to display the distribution of the first deviations by assigning, to the first subset of the point cloud, different colors according to the first deviations.

6. The three-dimensional measurement device according to claim 5, wherein the display controller is configured to control the display to display the distribution of the second deviations by assigning, to the second subset of the point cloud, different colors according to the second deviations.

7. A three-dimensional measurement device comprising:
a shape measurement unit configured to measure respective three-dimensional positions of a plurality of measurement points in a three-dimensional space, and to generate a point cloud representing a three-dimensional shape of a measurement target object from the respective three-dimensional positions;
a display configured to display the three-dimensional shape of the measurement target object based on the point cloud;
a type designator configured to receive a type of a basic shape from shapes including a cylinder, a cone, and a sphere;
a selector configured to receive a position on the three-dimensional shape displayed by the display, and to select, based on the position on the three-dimensional shape, a subset of the point;
an extractor configured to determine, as a curved reference surface, a geometric element of the basic shape fitting a subset of the point cloud selected by the selector, the basic shape corresponding the type of the basic shape designated by the designator;
a calculator configured to determine deviations of the subset of the point cloud with respect to the curved reference surface along a normal direction of the curved reference surface; and
a display controller configured to control the display to display, on the three-dimensional shape, a distribution of the deviations with respect to the curved reference surface.

8. The three-dimensional measurement device according to claim 7, further comprising a region designator configured to designate a parameter, along the normal direction of the curved reference surface, representing a deviation display target region including the curved reference surface,
wherein the display controller is configured to control the display to display the distribution of the deviations with respect to the curved reference surface within the deviation display target region designated by the parameter.

9. The three-dimensional measurement device according to claim 7,
wherein the basic shape is a cylinder, a cone, or a sphere, and
wherein the calculator determines deviations in a normal direction from a side surface of the cylinder, a side surface of the cone, or a surface of the sphere.

10. The three-dimensional measurement device according to claim 7, wherein the display controller is configured to control the display to display the distribution of the deviations by assigning, to the subset of the point cloud, different colors according to the deviations.

11. The three-dimensional measurement device according to claim 1, wherein a third subset of the point cloud is selected, based on a third position received as the position by the selector, wherein the extractor is configured to further determine a third geometric element fitting the third subset of the point cloud selected by the selector, and wherein the calculator is configured to further calculate a dimension of the measurement target object based on the third geometric element.

12. The three-dimensional measurement device according to claim 1, further comprising:
a stage having a horizontal surface on which the measurement target object is to be disposed; and
a rotation driver configured to rotate the stage with respect to the shape measurement unit around a rotation axis along a vertical direction,
wherein the shape measurement unit generates the point cloud representing the three-dimensional shape of the measurement target object by synthesizing pieces of the respective three-dimensional positions measured at different rotation angles around the rotation axis of the stage.

13. The three-dimensional measurement device according to claim 7, further comprising:
a stage having a horizontal surface on which the measurement target object is to be disposed; and
a rotation driver configured to rotate the stage with respect to the shape measurement unit around a rotation axis along a vertical direction,
wherein the shape measurement unit generates the point cloud representing the three-dimensional shape of the measurement target object by synthesizing pieces of the respective three-dimensional positions measured at different rotation angles around the rotation axis of the stage.

14. The three-dimensional measurement device according to claim 4, wherein the shape type designation unit further receives designation of a type of the basic shape with respect to the second reference surface, the extractor further determines the second reference surface based on the designation of the type of the basic shape with respect to the second reference surface.

* * * * *